United States Patent [19]

Atsumi et al.

[11] Patent Number: 4,633,064
[45] Date of Patent: Dec. 30, 1986

[54] SINTERED CERAMIC ELECTRIC HEATER WITH IMPROVED THERMAL SHOCK RESISTANCE

[75] Inventors: Morihiro Atsumi; Hitoshi Yoshida, both of Okazaki; Novuei Ito, Nukata; Kinya Atumi, Toyohashi, all of Japan

[73] Assignees: Nippondenso Co., Ltd., Kariya; Nippon Soken, Inc., Nishio, both of Japan

[21] Appl. No.: 739,474

[22] Filed: May 30, 1985

[30] Foreign Application Priority Data

May 30, 1984 [JP] Japan .................. 59-110109

[51] Int. Cl.$^4$ .................. H05B 3/12; F02P 19/02
[52] U.S. Cl. .................. 219/270; 123/145 A; 219/553; 252/516; 361/264
[58] Field of Search .................. 219/553, 260–270; 123/145 R, 145 A; 252/518; 361/264–266

[56] References Cited

U.S. PATENT DOCUMENTS

| | | | |
|---|---|---|---|
| 3,248,346 | 4/1966 | Amberg .................. | 252/518 |
| 3,875,476 | 4/1975 | Crandall et al. .................. | 219/553 X |
| 3,875,477 | 4/1975 | Fredriksson et al. .................. | 219/270 X |
| 3,895,219 | 7/1975 | Richerson et al. .................. | 219/553 |
| 4,357,526 | 11/1982 | Yamamoto et al. .................. | 219/270 X |
| 4,401,065 | 8/1983 | Minegishi et al. .................. | 123/145 A |
| 4,437,440 | 3/1984 | Suzuki et al. .................. | 123/145 A |
| 4,444,039 | 5/1984 | Fukazawa .................. | 219/553 |
| 4,475,029 | 10/1984 | Yoshida et al. .................. | 219/270 |
| 4,486,651 | 12/1984 | Atsumi et al. .................. | 219/553 |
| 4,499,366 | 2/1985 | Yoshida et al. .................. | 219/270 |

Primary Examiner—A. Bartis
Attorney, Agent, or Firm—Cushman, Darby & Cushman

[57] ABSTRACT

A sintered ceramic heater, particularly a heater for a glow plug of a diesel engine, includes a sintered ceramic heater, which generates heat upon receiving an electric current, supported by an electrically insulating sintered ceramic body. The heater element includes a U-shaped cross-section outer portion integrally sintered with and covering a central portion. Each portion is formed of a sintered ceramic body of a mixture of electrically conductive ceramic powder having an average diameter of not more than 2 μm and selected from the group consisting of $MoSi_2$, $WSi_2$, $TiB_2$ and TiC, and 35–75 mol % of electrically insulating ceramic powder, e.g., $Si_3N_4$. The central and outer portions have the same composition. However, in the central portion the average particle diameter of the conductive ceramic powder is equal to or larger than that of the insulating ceramic powder, whereas in the outer portion the average particle diameter of the conductive ceramic powder is not more than half that of the insulating ceramic powder. The specific resistance of the central portion is not less than 1.7 times as large as that of the outer portion so that the heat is generated by current flow through the outer portion of the ceramic heater.

4 Claims, 7 Drawing Figures

FIG.1(A)
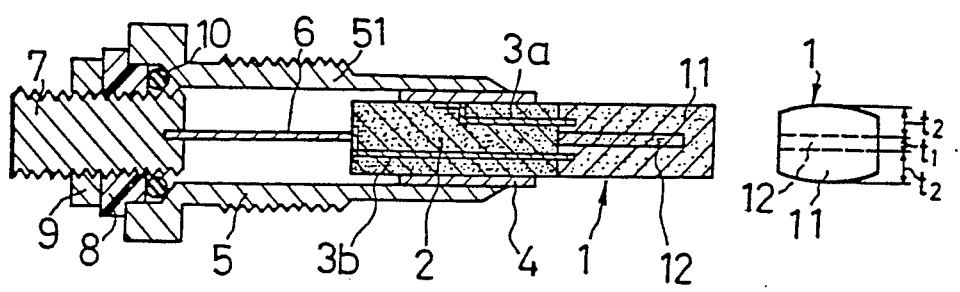
FIG.1(B)
FIG.2
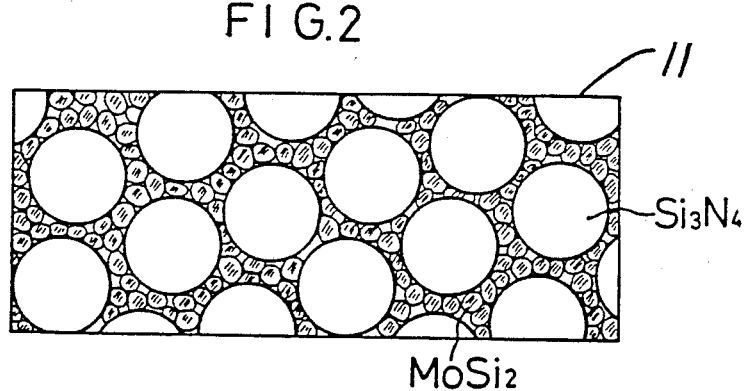
FIG.3
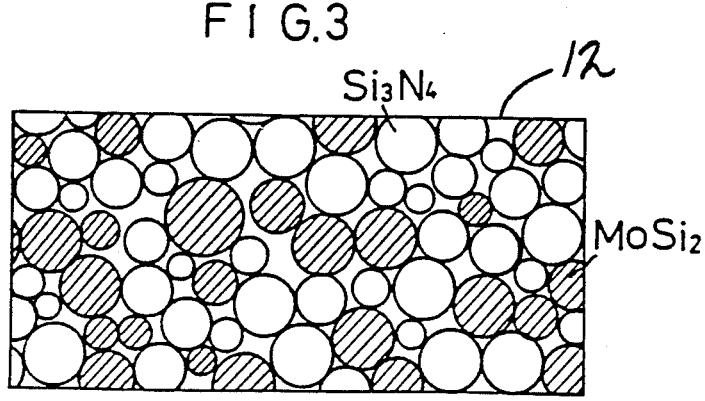

SINTERED CERAMIC ELECTRIC HEATER WITH IMPROVED THERMAL SHOCK RESISTANCE

BACKGROUND OF THE INVENTION

1. Field of the Invention

The present invention relates to a ceramic heater, particularly to a ceramic heater effectively applied to a glow plug of a diesel engine, etc.

2. Description of the Prior Art

The glow plug has been used for improving the startabillity of the diesel engine at a low temperature. So, the glow plug is required to exhibit a rapidly heating property.

The present inventors have developed a ceramic heater for use in the glow plug, which is formed by integrally sintering a heater element made of a mixed powder of molybdenum disilicate($MoSi_2$) as an electrically conductive ceramic having excellent oxidization resistance, and silicon nitride($Si_3N_4$) as an electrically insulating ceramic having low coefficient of thermal expansion, and a heater support member formed of electrically insulating ceramic sintered body for supporting the heater element, top end of which is covered with the heater element (U.S. application No. 659,959 now U.S. Pat. No. 556,780 and Japanese Patent application No. 59-70670), which formed the basis for U.S. application Ser. No. 06/717,875. The glow plug provided with this ceramic heater is superior in the rapidly heating property since the heater element thereof directly heats the interior of the combustion chamber.

$MoSi_2$, which is a constituent of the heater element gives oxidization resistance to the heater element while $Si_3N_4$ gives thermal shock resistance to the heater element.

However, this ceramic heater has a problem that thermal stress is produced in the joint of the support member and the heater element due to the difference in various properties such as the coefficient of thermal expansion, the thermal conductivity, etc. so as to decrease the thermal shock resistance of the ceramic heater.

SUMMARY OF THE INVENTION

One object of the present invention is to provide a ceramic heater suitable for a heater of a glow plug of a diesel engine.

Another object of the present invention is to provide a ceramic heater having excellent rapidly heating property and improved thermal shock resistance.

The ceramic heater of the present invention has a ceramic heater element composed of a central portion and an outer portion having a letter U-shaped cross section, which covers the central portion in close contact therewith.

The ceramic heater of the present invention further comprises a pair of lead wires connected to an electric power source. One end of each lead wire is connected to each of two ends of the outer portion.

The central portion and the outer portion are joined to each other by integrally sintering them. The outer portion is formed of a sintered body of a mixture of a conductive ceramic powder such as $MoSi_2$ powder and an insulating ceramic powder such as $Si_3N_4$ powder. In this case, the conductive ceramic powder has an average particle diameter smaller than that of the insulating ceramic powder, preferably not more than one half of that of the insulating ceramic powder.

As the conductive ceramic, tungsten silicate($WSi_2$), titanium boride($TiB_2$), titanium carbide($TiC$), etc. can be used in place of molybdenum disilicide($MoSi_2$).

The central portion is formed of a sintered body of a mixture of a conductive ceramic powder and an insulating ceramic powder. Each of the conductive ceramic powder and the insulating ceramic powder for the central portion is the same material as that for the outer portion except for the average particle diameter of each powder. In case of the central portion, the average particle diameter of the conductive ceramic powder is made equal to or larger than that of the insulating ceramic powder. The composition ratio of the conductive ceramic powder and the insulating ceramic powder for the central portion is equal to that for the outer portion.

In the outer portion of the heater element, $MoSi_2$ particles having a smaller diameter interconnect around the insulating ceramic particles. So, an electric current flows through the outer portion to make the outer portion generate heat. In the central portion of the heater element, the insulating ceramic particles having a smaller particle diameter intervene among the conductive ceramic particles having a larger particle diameter so that two kinds of ceramic particles are arranged in series to make the resistance of the central portion larger than that of the outer portion.

Therefore, the short circuit does not occur between two ends of the outer portion wherein the lead wires are connected, respectively.

As the composition of the central portion and the outer portion is equal to each other, the coefficient of thermal expansion, the thermal conductivity, and other various properties of both portions are substantially the same as each other. Therefore, no thermal stress is produced in the joint of the central portion and the outer portion.

BRIEF DESCRIPTION OF THE DRAWINGS

FIG. 1(A) is a longitudinal section of a glow plug provided with a ceramic heater according to the present invention;

FIG. 1(B) is an end view of the ceramic heater of FIG. 1(A);

FIG. 2 is a view illustrating the structure of the outer portion of the heater element as a model;

FIG. 3 is a view illustrating the structure of the central portion of the heater element as a model;

DETAILED DESCRIPTION OF THE INVENTION

Figure 4:
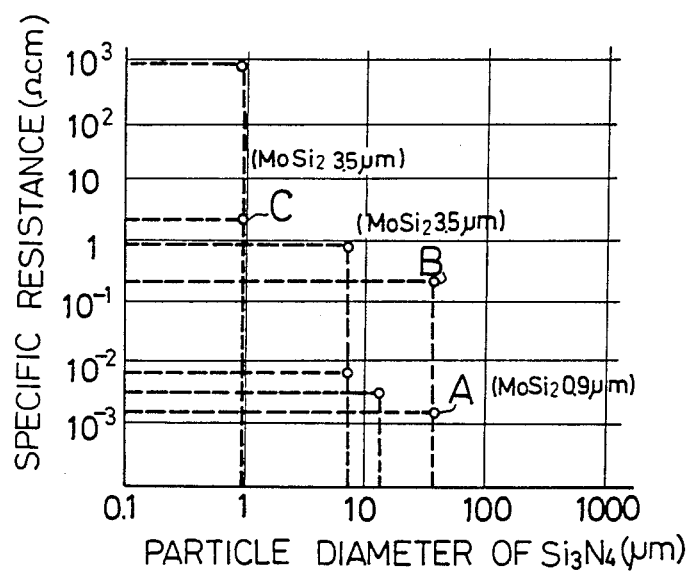
FIG. 4 is a graph showing the relation between the particle diameter of one component for forming the heater element, and the specific resistance thereof.

Hereinafter, the ceramic heater according to the present invention will be explained with reference to the embodiment wherein the heater is applied to a glow plug.

FIG. 1 illustrates a ceramic glow plug. As shown in FIG. 1, a heater element 1 formed by sintering a mixture powder of $MoSi_2$ and $Si_3N_4$ is joined to the tip end surface of a support member 2 formed by sintering a mixture powder of $Si_3N_4$ and alumina($Al_2O_3$). In the support member 2, are embedded lead wires 3a, 3b, each being made of tungsten and connected to the heater element 1. On the outer surface of the support member 2 is installed a metallic pipe 4. One and of a cylindrical metallic body 5 is joined to the metallic pipe 4. In the other open end of the metallic body 5 is fit a central electrode 7 through a bush 8. The cental electrode 7 and the bush 8 are secured to the body 5 by a nut 9. An O-ring 10 is disposed between the nut 9 and the body 5 for sealing.

The other end of the lead wire 3b is connected to the central electrode 7 by a holding pin 6 while the other end of the lead wire 3a is connected to the metallic pipe 4.

The glow plug having the above described structure is secured to a threaded hole (not shown) formed in the wall of a combustion chamber (not shown) of an engine (not shown) by a threaded portion 51 formed in the body 5.

The ceramic heater element 1 is composed of an outer portion 11 having a letter-U shaped cross section and a plate-shaped central portion 12 surrounded by the outer portion 12. Each of the outer portion 11 and the central portion 12 is formed of a sintered body of a mixture of $MoSi_2$ powder and $Si_3N_4$ powder, of which the composition ratio is equal to each other.

In the mixture for the outer portion 11, the average particle diameter of $MoSi_2$ powder is smaller than that of $Si_3N_4$ powder while in the mixture for the central portion 12, the average particle diameter of $MoSi_2$ powder is equal to or larger than that of $Si_3N_4$ powder.

FIGS. 2 and 3 illustrate the structure of the outer portion 11 and the central portion 12, as a model, respectively.

In the outer portion 11, $MoSi_2$ particles having conductivity surround $Si_3N_4$ particles to improve the electric conductivity thereof.

In the central portion 12, $MoSi_2$ particles and $Si_3N_4$ particles are arranged in series so that the specific resistance of the central portion 12 is larger than that of the outer portion 11.

FIG. 4 shows the relation between the specific resistance and the particle diameter of $Si_3N_4$ powder in the sintered body of the mixture of 30 mol% of $MoSi_2$ and 70 mol% of $Si_3N_4$.

In this case, two kinds of $MoSi_2$ powders having average particle diameters of 0.9 $\mu$m and 3.5 $\mu$m are used.

As is apparent from FIG. 4, the specific resistance is decreased as the average particle diameter of $Si_3N_4$ is increased relative to that of $MoSi_2$.

The resistance of each of the outer portion 11 and central portion 12 changes in accordance with the change of temperature thereof.

The resistance of the central portion 12 must be always made larger than that of the outer portion 11 in order to prevent the occurrence of the short circuit between two ends of the outer portion 11.

Figure 5A:
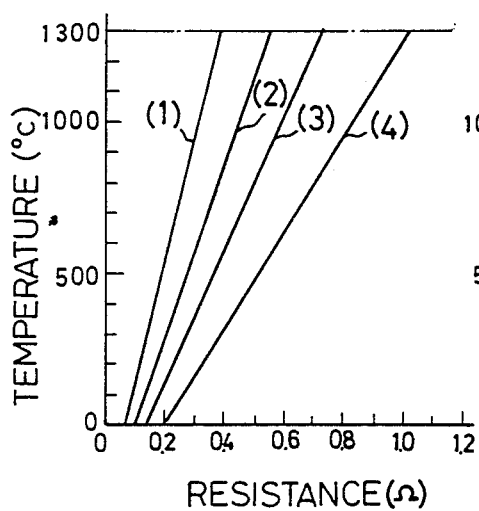
FIGS. 5(A), 5(B) are graphs, each showing the relation between the temperature of the heater element and the resistance thereof.
Figure 5B:
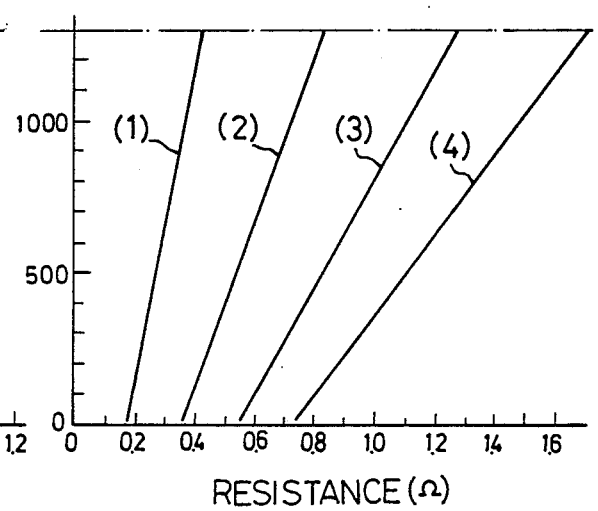

FIG. 5(A) shows the relation between the temperature and the resistance of the outer portion 11, and FIG. 5(B) shows the relation between the temperature and the resistance of the central portion 12. In FIGS. 5(A), 5(B), each of the heater elements (1) to (4) has the central portion formed of a mixture having the particle diameter combination B shown in FIG. 4 and the outer portion formed of a mixture having the particle diameter combination A shown in FIG. 4.

In the heater elements (1), (2), (3) nd (4), each of the outer portion 11 and the central portion 12 has different thickness from each other as shown in Table 1.

TABLE 1

| No. | $t_1$ (mm) | $t_2$ (mm) | Resistance at a normal temperature($\Omega$) |
|---|---|---|---|
| (1) | 0.5 | 1.45 | 0.057 |
| (2) | 1.0 | 1.2 | 0.083 |
| (3) | 1.5 | 0.95 | 0.110 |
| (4) | 2.0 | 0.7 | 0.160 |

In table 1, $t_1$ designates the thickness of the central portion 12 and $t_2$ designates the thickness of the outer portion 11. The resistance at a normal temperature ($\Omega$) means that of the central portion 12.

As is apparent from FIGS. 5(A) and 5(B), the resistance of each of the outer portion 11 and the central portion 12 is increased as the temperature rises. In any one of the heater elements (1) to (4), the resistance of the central portion 12 is larger than that of the outer portion 11 in the temperature range from 0° C. to 1300° C. Therefore, the heater elements (1) to (4) can be employed as the heater element for a glow plug.

The preferable resistance of the central portion 12 of the heater element of the glow plug is not less than about 1.7 times as large as that of the outer portion 11. So, the heater elements (2) to (4) are suitable for the heater element of the glow plug.

The central portion 12 can be formed of a sintered body having the particle diameter combination C shown in FIG. 4 in place of the sintered body having the combination B.

Next, the spalling test of the glow plug employing the heater element according to the present invention, and the glow plugs employing the heater elements of which the cental portion 12 is made of a sintered body of alumina, silicon carbide, silicon nitride, respectively, was conducted.

At first, voltage was applied to each glow plug to make it generate heat to various saturation temperatures and next the heater element of each glow plug was immersed in a water bath of which the temperature is 20° C. This heating and cooling cycle was repeated ten times and the temperature at which the change of the resistance of the central portion was increased by not less than 10% was examined. The test result is shown in Table 2. In Table 2, the mark X shows that the increase of the resistance of the central portion reaches 10% and the mark O shows that the increase thereof does not reach 10%.

TABLE 2

| | Central portion | Spalling temperature | | | | | |
|---|---|---|---|---|---|---|---|
| | | 250° C. | 300° C. | 350° C. | 400° C. | 450° C. | 500° C. |
| Comparable heater element 1 | $Al_2O_3$ | X | X | X | X | X | X |
| Comparable heater element 2 | SiC | | | | X | X | X |
| Comparable heater element 3 | $Si_3N_4$ | | | | | X | X |
| Heater element of the present invention | $MoSi_2$ + $Si_3N_4$ | | | | | | |

When the coefficient of thermal expansion, the thermal conductivity and other propreities of the central portion 12 of the heater element is different from those of the outer portion 11, cracks are produced in the joint of the central portion and the outer portion due to thermal stress. As the cracks spread in the outer portion 11, the resistance of the heater element is gradually increased.

As is apparent from Table 2, in the comparable heater elements 1,2, 3, such cracks as to increase the resistance by 10% are produced at 250° C. (in case that the central portion is formed of $Al_2O_3$), 400° C. (in case that the central portion is formed of SiC), 450° C. (in case that the central portion is formed of $Si_3N_4$). In contrast, in the heater element according to the present invention, such cracks as to increase the resistance by 10% are not produced at 500° C.

In the above embodiment, $MoSi_2$ is used as the conductive ceramic. Instead, $WSi_2$, $TiB_2$, TiC can be also used as the conductive ceramic.

The composition ratio of the electrically insulating ceramic in the heater element is selected from the range of 35 mol% to 75 mol%. Over 75 mol%, the specific resistance at a normal temperature of the heater element becomes too large so that rapidly heating property thereof is lowered.

Under 35 mol%, the thermal shock resistance of the heater element is lowered so as to reduce the durability thereof.

When the heater element is subjected to the repeated cooling and heating cycles, the resistance of the heater element has a tendency to be increased. This tendency becomes marked as the particle diameter of the conductive ceramic is increased. The preferable average particle diameter of the conductive ceramic is not more than 2 μm and the conductive ceramic is selected from the group consisting of $MoSi_2$, $WSi_2$, $TiB_2$ and TiC.

As described above, the ceramic heater of the present invention comprises a central portion formed of a ceramic sintered body and an outer portion formed of another ceramic sintered body. The outer portion surrounds the central poriton and is integrally sintered with the central portion.

The composition of the ceramic sintered body of the outer portion is the same as that of the central portion except for the specific resistance. The specific resistance of the central portion is made larger than that of the outer portion.

One end of each of a pair of lead wires is embedded in each of two ends of the outer portion at a predetermined distance.

When an electric current is passed throught the lead wires, it flows through the outer portion to make the heater element generate heat.

Since two ends of the outer portion of the heater element wherein the lead wires are embedded, are isolated from each other by the central portion, the short circuit therebetween can be prevented by the central portion having a high specific resistance. Since the outer portion is formed of the material having the same composition ratio as that of the material of the central portion and is joined to the central portion by integrally sintering therewith, cracks are not produced due to thermal stress when the cooling and the heating cycles are repeated. Therefore, the heater element of the present invention exhibits excellent thermal shock resistance so as to be effectively applied to a glow plug for a diesel engine.

What is claimed is:

1. A ceramic heater comprising:
    a ceramic heater element formed of a ceramic sintered body which generates heat upon receiving an electric current;
    a support member formed of an electrically insulating ceramic sintered body supporting said ceramic heater element;
    a current supply means for supplying an electric current to said ceramic heater element;
    said ceramic heater element comprising a central portion and an outer portion having a U-shaped cross-section and covering said central portion; each of said central portion and said outer portion being formed of a sintered body of a mixture of electrically conductive ceramic powder having an average particle diameter of not more than 2 μm and 35 to 75 mol% of electrically insulating ceramic powder, said central portion and said outer portion having the same composition as each other; in said central portion the average particle diameter of said electrically conductive ceramic powder being equal to or larger than that of said electrically insulating ceramic powder; in said outer portion the average particle diameter of said electrically conductive ceramic powder being not more than one half of that of said electrically insulating ceramic powder; and said outer portion being integrally sintered with said central portion, the specific resistance of said central portion being not less than 1.7 times as large as that of said outer portion.

2. A ceramic heater according to claim 1, wherein, said current supply means comprises a pair of lead wires and each of said lead wires is connected to a respective one of the end surfaces of said outer U-shaped portion.

3. A ceramic heater according to claim 2, wherein said ceramic heater element and said support member are joined to each other by integrally sintering, and said lead wires are embedded in said support member.

4. A ceramic heater acccording to claim 1, wherein said electrically conductive ceramic powder for forming said central portion and said outer portion is $MoSi_2$ powder and said electricaly insulating ceramic powder for forming said central portion and said outer portion is $Si_3N_4$ powder.

* * * * *